United States Patent [19]

Hannan, III et al.

[11] 4,343,591

[45] Aug. 10, 1982

[54] TURBOMACHINE SEAL SYSTEM

[75] Inventors: William F. Hannan, III, Pittsburgh; Charles C. Czuszak, Greensburg, both of Pa.

[73] Assignee: Elliott Turbomachinery Co., Inc., Jeannette, Pa.

[21] Appl. No.: 106,781

[22] Filed: Dec. 26, 1979

[51] Int. Cl.³ .................................................. F01D 11/00
[52] U.S. Cl. .................................. 415/169 R; 415/175
[58] Field of Search .............. 415/169 A, 169 R, 168, 415/175, 121 A

[56] References Cited

U.S. PATENT DOCUMENTS

| | | | |
|---|---|---|---|
| 1,761,702 | 6/1930 | Bradford et al. | 415/169 |
| 3,051,497 | 8/1962 | Wigg et al. | 415/169 A X |
| 3,180,568 | 4/1965 | Oettle | 415/169 |

FOREIGN PATENT DOCUMENTS

| | | | |
|---|---|---|---|
| 203731 | 5/1955 | Australia | 415/169 |
| 2398198 | 3/1979 | France | 415/169 R |
| 724892 | 2/1955 | United Kingdom | 415/169 |

*Primary Examiner*—Everette A. Powell, Jr.
*Attorney, Agent, or Firm*—J. Raymond Curtin

[57] ABSTRACT

A turbomachine seal system includes first and second seal members spaced axially about the shaft to define therebetween a first annular chamber. One of the seal members limits the flow of oil from a first portion of the turbomachine towards a second portion thereof. The second seal member limits the flow of process gas from the second portion of the turbomachine towards the first portion thereof. Pressure reducing means is connected to the chamber for reducing the pressure therein below the pressure in the first and second portions of the turbomachine for preventing oil from flowing from the first portion from migrating into the second portion.

1 Claim, 1 Drawing Figure

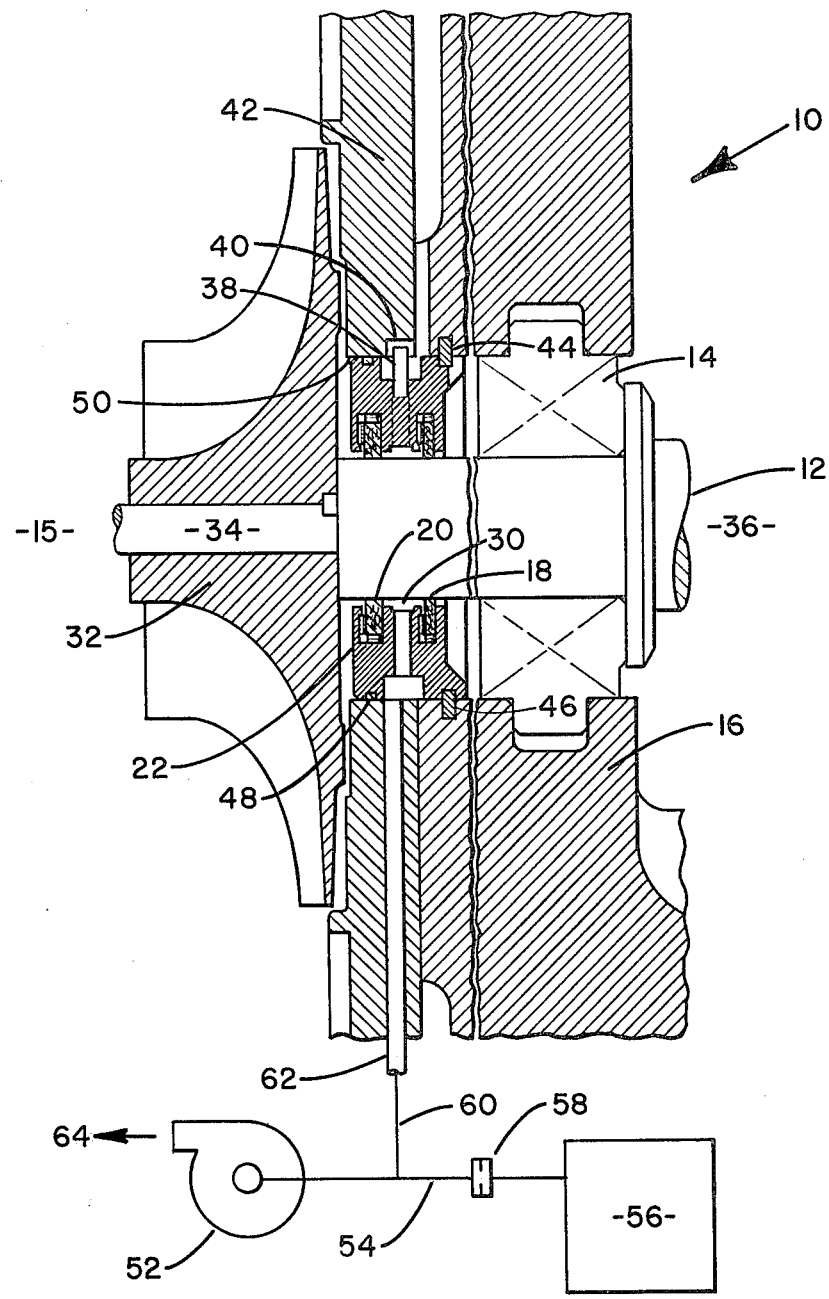

TURBOMACHINE SEAL SYSTEM

BACKGROUND OF THE INVENTION

This invention relates to a seal system for a turbomachine, and in particular, to a seal system operable to prevent migration of oil into the portion of the turbomachine having process gas flowing therethrough.

It is well recognized that seal oil or lubricating oil must, in most cases, be prevented from migrating into the portion of a turbomachine in which process gas is flowing to prevent contamination of the process gas. Mechanical seals are generally employed in an attempt to prevent the flow of oil into the process gas stream. Similarly, fluid seals, such as a buffer fluid, may also be employed either independently, or in conjunction with mechanical seals, in an attempt to prevent undesired oil flow.

Although in general, the use of such mechanical and/or fluid seals are effective in limiting the migration of oil into the process gas zone of a turbomachine, in some cases some migration of oil has occurred. For example, during periods of startup or shutdown, the pressure in the portion of the turbomachine containing the process gas will decrease, creating operating conditions during which undesirable oil migration will more likely occur, particularly in machines utilizing only mechanical seals. The inclusion of buffer fluid seal systems have not always increased the reliability of the seal system as desired. Further, buffer seal systems are relatively expensive to manufacture and use, and are rather difficult to maintain. It is therefore desirable to provide a seal system which operates effectively and efficiently and which may be provided at minimal additional cost.

SUMMARY OF THE INVENTION

It is accordingly an object of this invention to improve seal systems employed in turbomachines.

It is a further object of this invention to prevent migration of oil into a portion of the turbomachine having process gas flowing therethrough.

It is yet another object of this invention to establish a low pressure area between a first portion of the turbomachine and a second portion of the turbomachine to prevent oil migration from the first portion into the second portion.

It is a further object of this invention to partially evacuate a chamber disposed between first and second portions of a turbomachine to prevent oil flow from the first portion to the second portion.

These and other objects of the present invention are attained in a seal system for preventing oil from migrating into a portion of the turbomachine having process gas flowing therethrough. The seal system includes a first seal provided about the shaft for limiting the flow of oil from a first portion of the turbomachine towards a second portion thereof. A second seal is provided about the turbomachine shaft and is axially spaced from the first seal for limiting the flow of process gas from the second portion towards the first portion of the turbomachine. The first and second seals define therebetween an annular chamber. Pressure reducing means is connected to the chamber for reducing the pressure therein below the pressure in the first and second portions of the turbomachine for preventing oil contained within the first portion from migrating into the second portion.

BRIEF DESCRIPTION ON THE DRAWING

The single FIGURE of the drawing is a sectional, somewhat schematic, representation of a portion of a turbomachine illustrating the invention herein disclosed.

DESCRIPTION OF THE PREFERRED EMBODIMENT

Referring now to the drawing, there is disclosed a preferred embodiment of the present invention. The invention is incorporated in a turbomachine 10. Turbomachine 10 includes a rotatable shaft 12 supported by bearing 14. Bearing 14 is mounted within a casing or housing section 16. Shaft 12 may be the turbomachine's drive shaft, or may, as in the preferred embodiment be a pinion shaft of a gear system.

Shaft 12 extends into a first portion 15 of the turbomachine and has affixed thereto an axially aligned stud 34 upon which is mounted a process fluid handling member of the turbomachine, as for example, an impeller 32 of a compressor.

Seal members 18 and 20 annularly encircle shaft 12 and are axially spaced apart to define therebetween an annular chamber 30. A second portion 36 of turbomachine 10 may be formed by the drive section of the turbomachine. The fluid in second portion 36 will thus be oil. Seal member 18 limits the flow of oil from the second portion of the machine towards the first portion thereof. Seal member 20 limits the flow of process gas from first portion 15 towards the second portion 36. Seal members 18 and 20 are mounted within a generally cylindrical housing 22.

To prevent rotation of seal housing 22, a pin 38 is connected as by staking, to the housing. The pin extends radially from the outer periphery of the housing and is received in a groove 40 machined in the face of casing section 42. Retaining rings 44, 46 also prevent axial shifting of housing 22. Rings 44, 46 are insertable into a complimentary slot that is coextensively formed in seal housing 22 and casing section 16. An O-ring seal 48 is also mounted in a groove formed about the outer periphery of the seal housing, with the O-ring between arranged to seat in sealing contact against the surface of casing section 42 defining shaft opening 50, thus preventing the process gas from moving therebetween.

As indicated previously, it is desirable that all flow of oil from second portion 36 into first portion 15 be prevented to prevent contamination of the process gas. Although in most instances, mechanical seals 18 and 20 prevent undesirable oil flow, in some instances where the pressure of the oil in portion 36 far exceeds the pressure of the process gas in portion 15, some migration of oil will occur. For example, during startup or shutdown of the machine, there is generally a loss of pressure experienced in the portion 15 of the turbomachine containing the process fluid. Because some leakage occurs about seal members 18 and 20 into chamber 30, a pressure loss, particularly in portion 15 may allow oil from portion 36 to flow into portion 15. The apparatus of the present invention avoids the above problem by substantially reducing the pressure within chamber 30 below the pressure within portion 15 to prevent oil from migrating from portion 36 and chamber 30 into portion 15.

One readily available means for reducing the pressure within chamber 30 shall now be described. As is well recognized, an oil pump is generally employed with every turbomachine to supply lubricating oil to the various components of the turbomachine requiring same. Oil pump 52 has its inlet connected via conduit 54 to a suitable oil reservoir 56. An orifice 58 is provided within conduit 54 for creating a pressure decrease within the conduit downstream of the orifice. A conduit 60 is connected to conduit 54 downstream of orifice 58. Conduit 60 is suitably connected to capillary tube or other relatively small diameter tube 62 having its inlet connected to chamber 30. Thus, the inlet to pump 52 is in communication with chamber 30 via conduit 60 and tubing 62. The outlet 64 from pump 52 is suitably connected to portions of the turbomachine requiring lubricating oil for lubrication purposes.

In operation, pump 52 reduces the pressure within chamber 30 and in fact partially draws a vacuum therein. Orifice 58 in conduit 54 provides a suitable pressure drop to insure that operation of pump 52 will decrease the pressure within chamber 30 as desired.

By reducing the pressure within chamber 30 below the pressure in either portions 15 or 36, any oil bypassing seal member 18 will collect within chamber 30 and will flow through tubing 62 and conduit 60 into the inlet of pump 52. None of the oil will migrate past seal member 20 as the pressure in portion 15 exceeds the pressure within chamber 30. The diameter of tubing 62 is relatively small as compared to the diameter of conduit 60 to insure that a substantial flow of oil will pass to pump 52 from reservoir 56 to prevent loss of the pump prime.

Pump 52 may preferably be an auxiliary oil pump which is only activated during startup or shutdown. As indicated previously, the present invention provides particular utility during startup or shutdown of the turbomachine.

The seal system herein disclosed effectively prevents any migration of oil into the process fluid zone of a turbomachine to prevent contamination of the process fluid by any mixing of the oil therewith. The seal system is relatively inexpensive to manufacture or to provide on a retrofit basis as the only additional components required are relatively inexpensive tubing to connect chamber 30 to the inlet of pump 52.

While a preferred embodiment of the present invention has been described and illustrated, the invention should not be limited thereto but may be otherwise embodied within the scope of the following claims.

We claim:

1. A turbomachine seal system for preventing oil from migrating into a first portion of a turbomachine having process gas flowing therethrough comprising:

a first seal provided about a shaft of the turbomachine for limiting the flow of oil from a second portion of the turbomachine towards the first portion thereof;

a second seal provided about the shaft and axially spaced from the first seal for limiting the flow of process gas from the first portion towards the second portion of the turbomachine, said first and second seals defining an annular chamber therebetween;

lubrication means for supplying lubricant to the parts of the turbomachine requiring same, said lubrication means including a reservoir for storing lubricant and a pump for delivering lubricant from the reservoir; and means connecting the lubricant pump to the annular chamber for reducing the pressure therein below the pressure in the first and second portions of the turbomachine for preventing oil from the second portion from migrating into the first portion, said means including a first conduit connecting the annular chamber with the inlet to the pump, a second conduit connected to the first conduit extending to the chamber and a pressure reducing device disposed between the pump inlet and the reservoir upstream of the connection between the first and second conduits.

* * * * *